US011062153B2

(12) United States Patent
Lee et al.

(10) Patent No.: US 11,062,153 B2
(45) Date of Patent: Jul. 13, 2021

(54) APPARATUS AND METHOD FOR CONVERTING IMAGE

(71) Applicant: SAMSUNG ELECTRONICS CO., LTD., Suwon-si (KR)

(72) Inventors: Jae-woo Lee, Hwaseong-si (KR); Yoon-suk Hyun, Suwon-si (KR); Ja-hoo Koo, Seoul (KR); Cheol-hun Jang, Pohang-si (KR); Dae-hyun Ji, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 16/531,859

(22) Filed: Aug. 5, 2019

(65) Prior Publication Data

US 2020/0117920 A1    Apr. 16, 2020

(30) Foreign Application Priority Data

Oct. 15, 2018   (KR) ........................ 10-2018-0122245

(51) Int. Cl.
*G06K 9/00* (2006.01)
*G06T 17/05* (2011.01)
*G08G 1/16* (2006.01)
*G06K 9/78* (2006.01)

(52) U.S. Cl.
CPC ..... *G06K 9/00798* (2013.01); *G06K 9/00208* (2013.01); *G06K 9/00805* (2013.01); *G06K 9/78* (2013.01); *G06T 17/05* (2013.01); *G08G 1/167* (2013.01)

(58) Field of Classification Search
CPC .. G06K 9/00798; G06K 9/00208; G06K 9/78; G06K 9/00805; G06K 9/4604; G06K 9/00791; G06K 9/342; G06T 17/05; G06T 2207/30256; G06T 2207/30261; G06T 7/536; G06T 7/12; G08G 1/167
See application file for complete search history.

(56) References Cited

U.S. PATENT DOCUMENTS 8,520,935 B2    8/2013   Wang et al.
2002/0031242 A1 *  3/2002   Yasui ................. G06K 9/00798
                                          382/104
(Continued)

FOREIGN PATENT DOCUMENTS

CN       105869109 A      8/2016
EP         1944734 A2 *   7/2008  ........... H04N 13/239
(Continued)

*Primary Examiner* — Edward F Urban
*Assistant Examiner* — Wassim Mahrouka
(74) *Attorney, Agent, or Firm* — Sughrue Mion, PLLC (57) ABSTRACT

Provided are an apparatus and a method for converting an image. The apparatus includes an image sensor configured to obtain an image of a road, and a processor. The processor is configured to segment an input image into a plurality of region images, determine a vanishing point corresponding to each of the plurality of region images, obtain a translation relation for converting two-dimensional (2D) coordinates of a point in a region image among the plurality of region images into three-dimensional (3D) coordinates, based on a vanishing point of the region image, and generate road profile data based on translation relations of the plurality of region images.

20 Claims, 10 Drawing Sheets

(56) References Cited

U.S. PATENT DOCUMENTS

| | | | |
|---|---|---|---|
| 2005/0196019 A1* | 9/2005 | Taniguchi | G06K 9/00798 382/104 |
| 2012/0327188 A1* | 12/2012 | Takemura | G08G 1/16 348/46 |
| 2013/0103259 A1* | 4/2013 | Eng | B60G 17/0165 701/37 |
| 2013/0148856 A1 | 6/2013 | Lu et al. | |
| 2018/0046867 A1* | 2/2018 | Yang | G06K 9/6215 |
| 2019/0122054 A1* | 4/2019 | Kumano | B60W 40/072 |
| 2020/0134896 A1* | 4/2020 | Chang | G01C 21/3638 |

FOREIGN PATENT DOCUMENTS

| | | |
|---|---|---|
| JP | 4355535 B2 | 11/2009 |
| JP | 6179639 B2 * | 8/2017 |
| JP | 6179639 B2 | 8/2017 |
| JP | 2017-156965 A | 9/2017 |
| KR | 10-0472823 B1 | 3/2005 |
| KR | 10-2006-0007665 A | 1/2006 |
| KR | 10-1655204 B1 | 9/2016 |

* cited by examiner

APPARATUS AND METHOD FOR CONVERTING IMAGE

CROSS-REFERENCE TO RELATED APPLICATION

This application claims priority to Korean Patent Application No. 10-2018-0122245, filed on Oct. 15, 2018, in the Korean Intellectual Property Office, the disclosure of which is incorporated herein in its entirety by reference.

BACKGROUND

The inventive concept relates to a technique of converting an image, and more particularly, to an apparatus and a method for converting an image.

Automated driving (e.g., advanced driver assistance system (ADAS), etc.) requires active cruise control (ACC) technology. The ACC technology is to allow a first vehicle currently navigating to detect the velocity of a second vehicle ahead of the first vehicle in the same lane and adjust the velocity of the first vehicle so as to maintain a distance from the second vehicle to prevent a collision.

Currently, some vehicles have a function of navigating at an input target speed when there is no vehicle ahead, and a function of decelerating, when another vehicle appears in front of the vehicle, based on the velocity of the other vehicle so as to maintain a distance from the other vehicle. To implement such technology, there is a need to accurately measure locations of neighboring objects around the vehicle.

SUMMARY

According to an aspect of an embodiment, there is provided a method of converting an image, the method including: segmenting an input image of a road into a plurality of region images; determining vanishing points corresponding to the plurality of region images; obtaining a translation relation for converting two-dimensional (2D) coordinates of a point in a region image among the plurality of region images into three-dimensional (3D) coordinates, based on a vanishing point corresponding to the region image; and generating road profile data based on translation relations of the plurality of region images.

According to an aspect of another embodiment, there is provided a non-transitory computer-readable recording medium having recorded thereon at least one computer program including a command for executing the method according to an embodiment.

According to an aspect of still another embodiment, there is provided an apparatus for converting an image, the apparatus including: an image sensor configured to obtain an input image of a road; and a processor configured to: segment the input image into a plurality of region images, and determine vanishing points corresponding to the plurality of region images; obtain a translation relation for converting two-dimensional (2D) coordinates of a point in a region image among the plurality of region images into three-dimensional (3D) coordinates, based on a vanishing point corresponding to the region image; and generate road profile data based on translation relations of the plurality of region images.

BRIEF DESCRIPTION OF THE DRAWINGS

The above and/or other aspects will become apparent and more readily appreciated by describing certain embodiments with reference to the accompanying drawings, in which.

DETAILED DESCRIPTION

Figure 1:
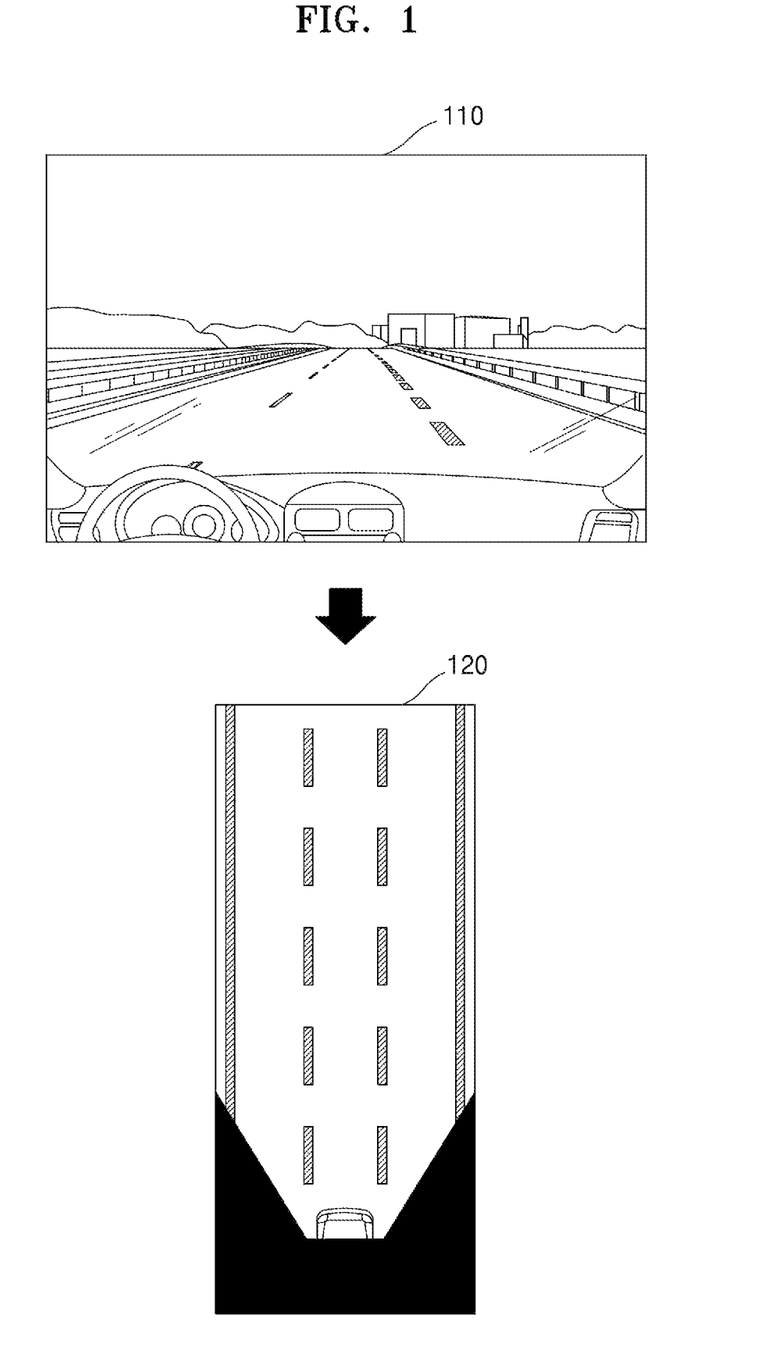
FIG. 1 is a diagram for explaining image conversion according to an embodiment.

FIG. 1 is a diagram for explaining image conversion according to an embodiment.

According to an embodiment, an apparatus for converting an image (or an image converting apparatus) may convert an input image 110 obtained from a first view into an output image 120 at a second view. For example, referring to FIG. 1, the first view may be a perspective view taken from a vehicle, and the second view may be a top view taken from above the vehicle. The image converting apparatus may calculate a translation relation to convert the input image 110 at the first view into the output image 120 at the second view.

For example, basic operations for navigation in an automated driving system may include an operation of detecting a lane, an operation of controlling to navigate on the lane (e.g., at the center of the lane), and an operation of maintaining a distance with a vehicle ahead. In a camera-based automated driving system, the above operations may be performed based on images obtained by a camera, such as a monocular camera. A self-driving vehicle may determine location relations to a neighboring object or a background (e.g., a road) based on the images obtained by the monocular camera and may perform the above operations for navigation.

The image converting apparatus according to an embodiment may be implemented in a self-driving vehicle. The image converting apparatus may determine points of a physical world to which pixels of the input image 110 are mapped, based on the translation relation for converting the input image 110 at the first view into the output image 120 at the second view. Therefore, the image converting apparatus may determine three-dimensional (3D) coordinates corresponding to two-dimensional (2D) coordinates of respective pixels included in the input image 110.

For example, the image converting apparatus may calculate a homography matrix with respect to the ground, based on extrinsic parameters of the camera. The image converting apparatus may convert each pixel of the input image 110 based on the homography matrix. The image converting apparatus may convert the input image 110 at the first view based on the homography matrix, thereby obtaining the output image 120 at the second view.

The self-driving vehicle may perform fitting after obtaining lane line information of a physical world domain through the homography conversion. Also, the self-driving vehicle may predict a distance to a vehicle ahead, based on information obtained by using the monocular camera. For example, the self-driving vehicle may detect a bounding box including vehicles ahead from the input image 110 at the first view and project the bounding box to the second view, thereby predicting a distance to the projected bounding box.

However, when an inclination level of the road changes, the accuracy of the conversion using one homography may decrease. This is because the homography matrix may be generated based on an assumption that an inclination level is zero (that is, no inclination) and a distortion may occur when a target point of a road having an inclination level greater than zero is converted by using the homography matrix. To solve this problem, the image converting apparatus according to an embodiment may calculate different homography matrices for respective regions, which are segmented (or classified) according to inclination levels, to accurately convert the input image 110 at the first view into the output image 120 at the second view.

Accordingly, even when the inclination level of the road in front of the image converting apparatus changes, the image converting apparatus according to an embodiment may calculate a translation relation for accurately converting the input image 110 at the first view into the output image 120 at the second view. The image converting apparatus according to an embodiment may generate accurate road profile data from the input image 110 at the first view and may perform the accurate detection of the road boundary line and the detection of a distance with the vehicle ahead, based on the road profile information. For reference, the road profile information may indicate profile information that defines an inclination level, a location, a height, a curve, and the like of the road ahead, with respect to the image converting apparatus.

Figure 2:
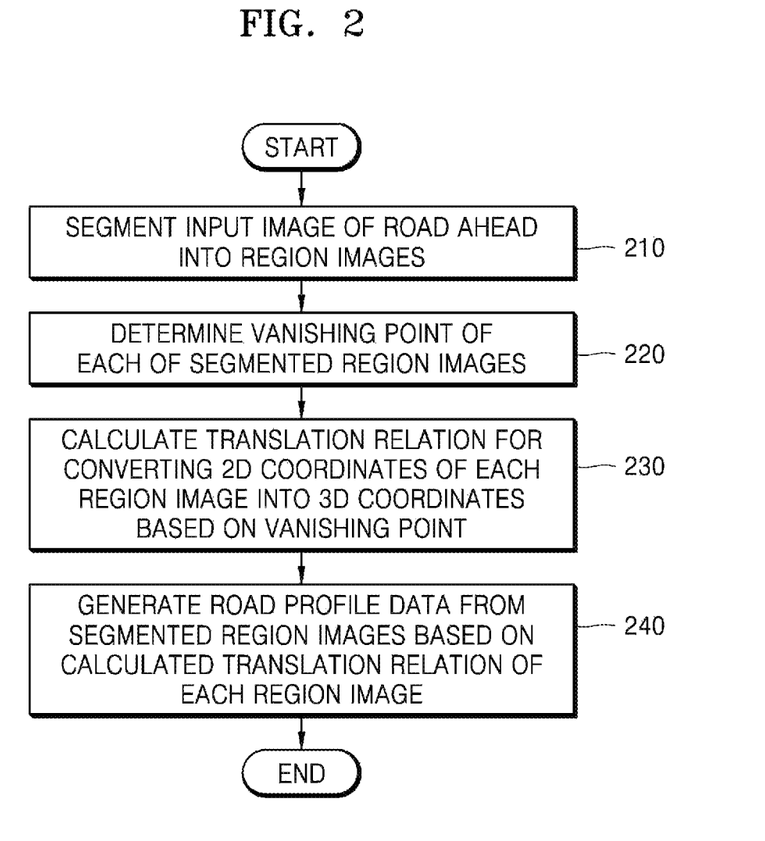
FIG. 2 is a flowchart of a method of converting an image, according to an embodiment.

FIG. 2 is a flowchart of a method of converting an image, according to an embodiment.

The image converting apparatus according to an embodiment may classify regions according to an inclination level of the road shown in an input image and may calculate a translation relation for converting 2D coordinates of each region of the input image into 3D coordinates.

In operation 210, the image converting apparatus may segment an input image showing a road ahead into region images. The image converting apparatus may include an image obtainer (or an image sensor or a camera), and the image obtainer may observe the front. For example, when the image converting apparatus is installed in a vehicle, the image obtainer may be installed in a manner such that an optical axis thereof is parallel to a longitudinal axis of the vehicle. The optical axis of the image obtainer may correspond to a center axis of a viewing angle of the image obtainer. The image converting apparatus may obtain the input image regarding the road ahead by using the image obtainer. The image converting apparatus may extract a region corresponding to the road from the input image. The image converting apparatus may segment the region corresponding to the road into region images. For example, the image converting apparatus may segment the input image into the region images, based on a critical point of a boundary line of a lane which is detected from the input image. The region images may indicate images including the region of the input image that corresponds to the road. The region image segmentation will be described in detail later with reference to FIGS. 3 to 6.

In operation 220, the image converting apparatus may determine a vanishing point of each of the segmented region images. The vanishing point may be a point at which two extended road boundary lines, which are shown in the image, cross each other at the first view (e.g., a perspective view). The image converting apparatus may calculate the vanishing point of each region image. The calculation of the vanishing point will be further described later with reference to FIGS. 7 and 8.

In operation 230, the image converting apparatus may calculate a translation relation for converting 2D coordinates of each region image into 3D coordinates, based on the vanishing point. The translation relation may be a relation for converting 2D coordinates of pixels included in the region image into 3D coordinates in a physical world. The translation relation will be described in detail later with reference to FIG. 9.

In operation 240, the image converting apparatus may generate road profile data by using the segmented region images, based on the translation relation calculated with regard to each region image. As described above, the road profile data may indicate profile data defining a face of a road, an inclination level thereof, and locations of target points included in the road. For example, the road profile data may be a collection of 3D physical coordinates converted from the 2D pixel coordinates of the input image.

As described above, the image converting apparatus may calculate the translation relations of respective region images segmented according to the inclination level of the road and thus may determine a translation relation corresponding to a change in the inclination level of the road. Therefore, the image converting apparatus may minimize or avoid the distortion that may occur during an operation of converting the 2D pixel coordinates into 3D physical coordinates.

For reference, an order in which the image converting apparatus performs the operations of FIG. 2 is not limited to the stated order. The image converting apparatus may perform some or all of the operations of FIG. 2 sequentially or in parallel. For example, the image converting apparatus may calculate a vanishing point and a translation relation of one of the region images, which are segmented in operation 210, according to operations 220 and 230 and then may calculate a vanishing point and a translation relation of a next region image according to operations 220 and 230.

Operation 210 of segmenting the input image into the region images according to the inclination level of the road will be described below with reference to FIG. 3.

Figure 3:
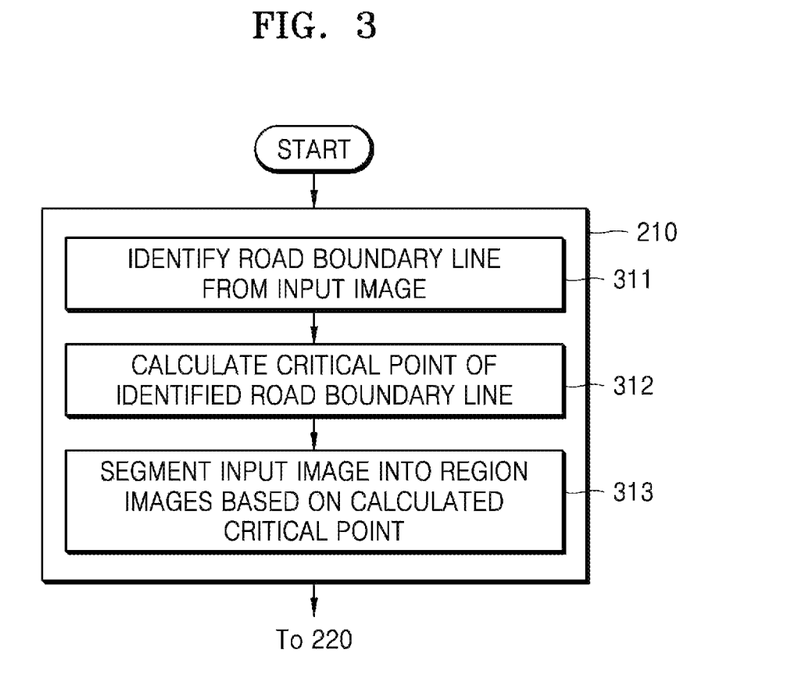
FIG. 3 is a flowchart for explaining image segmentation according to an embodiment.

FIG. 3 is a flowchart for explaining image segmentation according to an embodiment.

In operation 311, the image converting apparatus according to an embodiment may identify the road boundary line from the input image. The image converting apparatus may identify the road boundary line from a road region of the input image. The road boundary line is a line that is used to define a road (e.g., a lane) and may be a solid line, a dashed line, or the like which is painted on the road or may be curbs or the like that are placed along the road. When the road boundary line is identified as a dashed line, the image converting apparatus may interpolate the dashed line and detect the road boundary line in a form of a solid line. Also, when the road includes a plurality of lanes, the image converting apparatus may distinguish and identify road boundary lines that define lanes.

In operation 312, the image converting apparatus may calculate a critical point of the identified road boundary line. The image converting apparatus may detect the critical point to segment the input image into the region images according to the inclination levels of the road. For example, when it is assumed that the road is a straight road, a slope of the road boundary line defining the lane may change in the input image. A slope of a road boundary line from the vehicle to a point at which a hill appears may differ from a slope of a road boundary line from a start point of the hill. The critical point is a point at which the slope of the road boundary line changes at a certain degree or greater and thus may correspond to a critical point at which an inclination level of the road changes. The critical point may be one point in the image, but is not limited thereto. There may be a plurality of critical points in the image. The detection of the critical point will be described in detail with reference to FIGS. 5 and 6.

In operation 313, the image converting apparatus may segment the input image into the region images based on the calculated critical point. For example, the image converting apparatus may segment the input image based on a horizontal line of the input image that includes the critical point. When there is one critical point, the image converting apparatus may segment the input image into two region images. Also, where there are two or more critical points, the image converting apparatus may segment the input image into region images corresponding to the respective critical points. For example, when there are k critical points, the image converting apparatus may segment the input image into (k+1) region images (where, k is an integer greater than 1).

Figure 4:
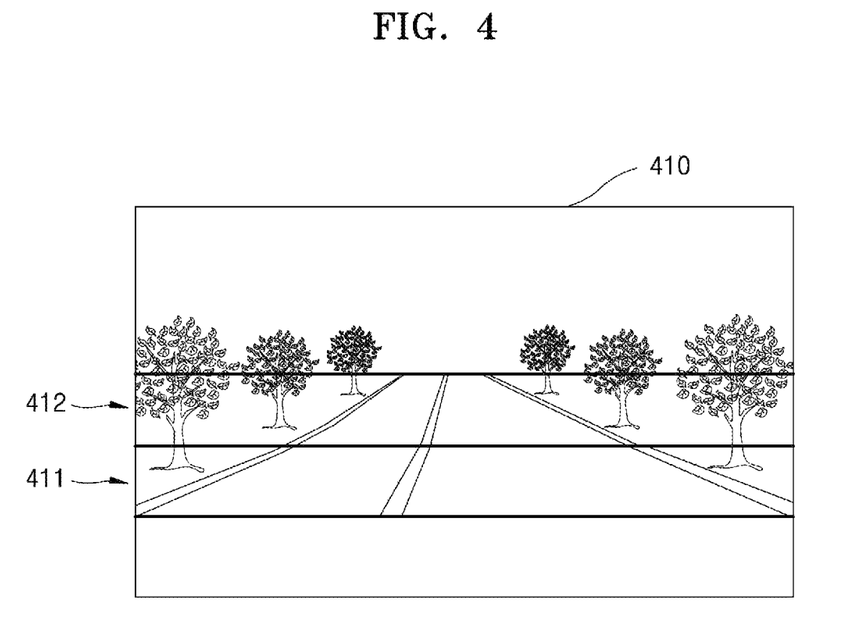
FIG. 4 is a diagram of an example of a region image, according to an embodiment.

FIG. 4 is a diagram of an example of a region image, according to an embodiment.

As described with regard to operation 210 of FIG. 2, the image converting apparatus may segment an input image 410 into region images. For example, the image converting apparatus may identify a road region from the input image 410 at the first view. When the image converting apparatus is installed in the vehicle, at least a part of the input image 410 (e.g., a bottom portion shown in FIG. 4) may include an obstacle (e.g., a hood of the vehicle or components inside the vehicle), according to a viewing angle of the image obtainer of the image converting apparatus. The image converting apparatus may identify the road region except for the obstacle. For reference, lowermost portions of the input image 410 of FIG. 4 and input images 510, 810, and 910 of FIGS. 5, 8, and 9 may be covered by obstacles (e.g., a hood), and the image converting apparatus may exclude regions including the obstacles when identifying the road region from the input image 410.

The image converting apparatus may segment the road region into region images. For example, the image converting apparatus of FIG. 4 may segment the input image 410 into a first region image 411 and a second region image 412, based on the critical point. However, the number of region images is not limited to two. The image converting apparatus may segment the input image 410 into n region images (where, n is an integer equal to or greater than 2).

For illustrative purposes, an example in which the image converting apparatus uses the critical point to accurately reflect a change in the inclination level of the road is described. However, it should be noted that a criterion of the region image segmentation is not limited to the critical point. For example, but the image converting apparatus may segment the road region of the input image 410 at vertical equidistant intervals without calculating the critical point.

Figure 5:
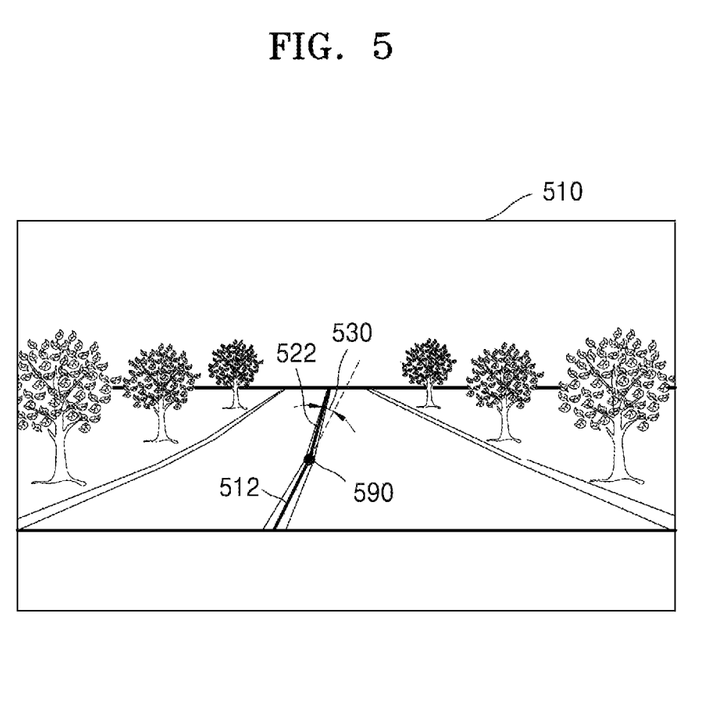
FIG. 5 is a diagram for explaining region segmentation based on a calculated critical point, according to an embodiment.

Referring to FIG. 5, the region segmentation based on the critical point will be described as an example.

FIG. 5 is a diagram for explaining region segmentation based on a calculated critical point, according to an embodiment.

According to an embodiment, the image converting apparatus may determine a point 590, as a critical point, in the input image 510 at which a slope difference between road boundary lines greatly changes (e.g., a preset degree or greater). For example, when a slope difference between two neighboring road boundary lines among road boundary lines shown in the first input image 510 is greater than a threshold difference, the image converting apparatus determines the point 590 between two neighboring road boundary lines as the critical point.

Referring to FIG. 5, the road boundary line may be divided into a first road boundary line 512 and a second road boundary line 522. The image converting apparatus may calculate an angular difference 530 between a slope of the first road boundary line 512 and a slope of the second road boundary line 522. In response to the angular difference 530 being greater than a threshold angle, the image converting apparatus may determine, as the critical point, the point 590 between the first road boundary line 512 and the second road boundary line 522.

An example of an operation of detecting the critical point 590 will be described with reference to FIG. 6.

Figure 6:
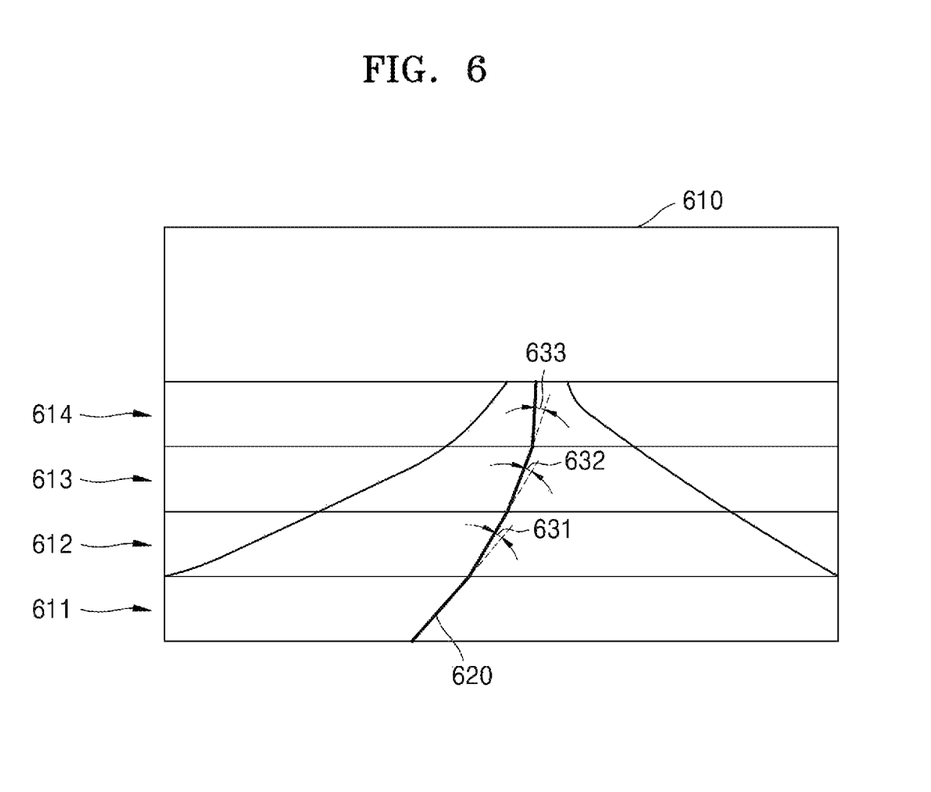
FIG. 6 is a diagram for explaining detection of critical points, according to an embodiment.

FIG. 6 is a diagram for explaining detection of critical points, according to an embodiment.

The image converting apparatus may divide an identified road boundary line 620 into sections. The image converting apparatus may calculate respective slopes of road boundary lines shown in the sections. The image converting apparatus may calculate the critical points based on the slopes of some road boundary lines. The section may indicate a unit region into which an input image is divided. The image converting apparatus may determine a slope between a bottom point and a top point of the road boundary line in each section, as a slope of a corresponding region. The slope of the road boundary line shown in each region may be used to determine the critical point in an input image 610.

For example, the image converting apparatus of FIG. 6 may divide the input image 610 into four sections. The image converting apparatus may divide a road region of the input image 610 into four sections. The image converting apparatus may calculate a slope corresponding to each section based on a road boundary line 620. The image converting apparatus may calculate a first angle 631 corresponding to a slope difference between a first section 611 and a second section 612 of the road boundary line 620, a second angle 632 corresponding to a slope difference between the second section 612 and a third section 613, and a third angle 633 corresponding to a slope between the third section 613 and a fourth section 614. The image converting apparatus may determine, as a critical point, a point between road boundary lines of two neighboring sections, in response to an angle corresponding to a slope difference between two sections being greater than a threshold angle. According to a change in an inclination level of the road, critical points may not exist, or there are one or more critical points in the input image 610.

FIG. 6 shows an example in which the input image 610 is divided into four sections, but one or more embodiments are not limited thereto ad the input image 610 may be divided into any arbitrary number of sections. The image converting apparatus may divide the input image 610 into m sections (where, m is an integer equal to or greater than 2).

Also, among three neighboring sections of the input image 610, the image converting apparatus may determine that the critical point is located at a center section in response to a slope difference between a slope corresponding to a bottom section among the three neighboring sections and a slope corresponding to a top section among the three neighboring sections being greater than a section threshold value. The image converting apparatus may divide the center section into sub-sections and may determine a point, at which a slope change of the road boundary line 620 of each sub-section is greater than a threshold value, as the critical point. For example, referring to FIG. 6, in response to a slope difference between a slope corresponding to the second section 612 and a slope corresponding to a fourth section 614 being greater than a section threshold difference, the image converting apparatus may determine that the critical point exists in the third section 613. The image converting apparatus may divide the third section 613 into sub-sections and may determine the critical point within the third section 613 based on a slope of the sub-section.

In an embodiment, when there are a plurality of road boundary lines exist in the input image 610, the image converting apparatus may select a road boundary line 620 that is the nearest to the center of the input image 610 among the plurality of road boundary lines shown in the input image 610. The image converting apparatus may calculate a critical point of the selected road boundary line 620. According to an embodiment, the clearer road boundary line 620 is used in determining the critical point because the road boundary line becomes clearer when it is closer to the center of the input image 610. Also, a possibility that the road boundary line 620 deviates a viewing angle of the image obtainer is relatively low.

The image converting apparatus may determine a distance to the critical point, for example, a depth. The image converting apparatus may indirectly predict or may directly detect the distance from the vehicle to the critical point.

An operation of determining vanishing points of divided region images will be described with reference to FIG. 7.

Figure 7:
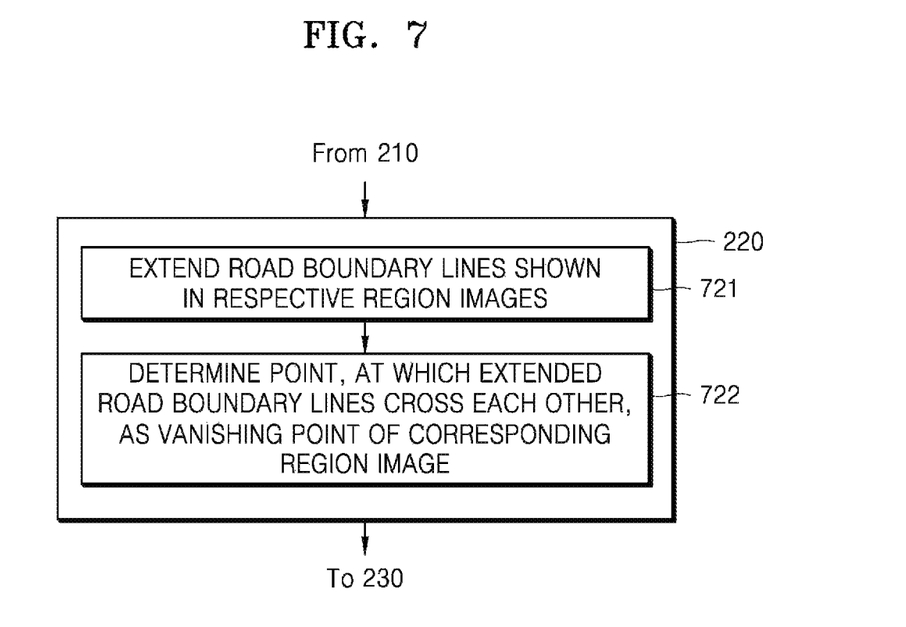
FIG. 7 is a flowchart for explaining determination of vanishing points, according to an embodiment.
Figure 8:
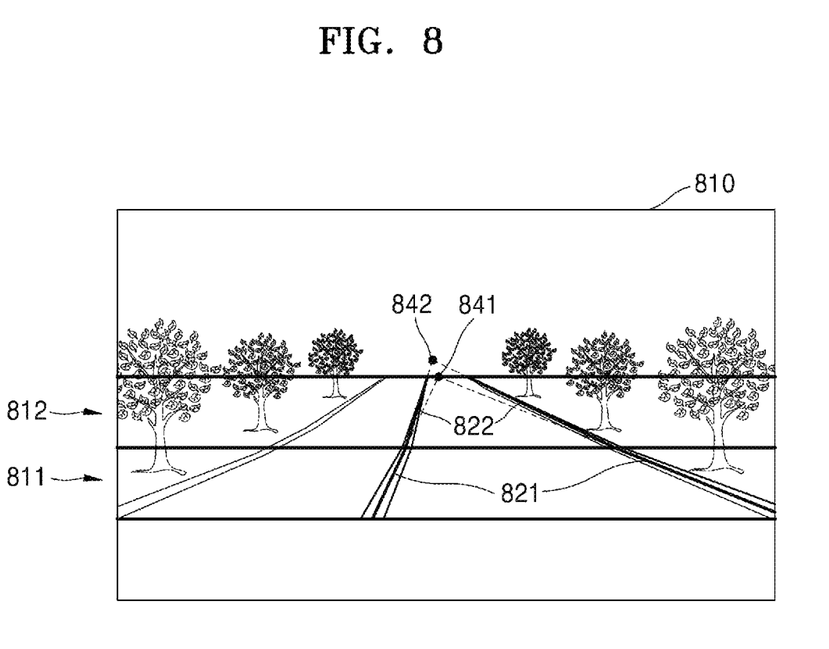
FIG. 8 is a diagram for explaining a vanishing point of each region image, according to an embodiment.

FIG. 7 is a flowchart for explaining determination of vanishing points, according to an embodiment. FIG. 8 is a diagram for explaining a vanishing point of each region image, according to an embodiment.

The image converting apparatus may determine a pixel location on an input image with regard to determined vanishing points.

In operation 721, the image converting apparatus may extend a road boundary line of each region image. For example, as shown in FIG. 8, with respect to an input image 810, the image converting apparatus may extend road boundary lines 821 of a first region image 811 in the input image. The image converting apparatus may extend road boundary lines 822 of a second region image 821.

In operation 722, the image converting apparatus may determine a point, at which the extended road boundary lines cross each other, as a vanishing point of a corresponding region image. For example, the image converting apparatus may determine a point, at which the extended road boundary lines 821 of the first region image cross each other, as a first vanishing point 841. The image converting apparatus may determine, as a second vanishing point 842, a point at which the extended road boundary lines 822 of the second region image cross each other. The image converting apparatus may determine pixel coordinates of a point of the input image, at which the extended road boundary lines cross each other, as pixel coordinates of a vanishing point.

For reference, FIG. 8 shows an example in which two road boundary lines of each region image extend. However, one or more embodiments are not limited thereto. Depending on the number of lanes forming the road, the image converting apparatus may extend at least three road boundary lines. In this case, the extended road boundary lines may cross at a single point, but may cross at multiple points. In response to the extended road boundary lines crossing at multiple points, the image converting apparatus may determine a single point as a vanishing point based on the points. For example, the image converting apparatus may determine an average point of the points, at which the extended road boundary lines cross, as a vanishing point of a corresponding region image.

The image converting apparatus may retrieve a vanishing point by extending a road boundary line of a lane on which a vehicle is currently navigating. However, one or more embodiments are not limited thereto. The image converting apparatus may determine a vanishing point by extending a road boundary line of one or more another lanes.

Also, an operation order is not limited to the order shown in FIG. 7. For example, the image converting apparatus may determine a first vanishing point by extending a road boundary line of the first region image and then may determine a second vanishing point by extending a road boundary line of the second region image.

Figure 9:
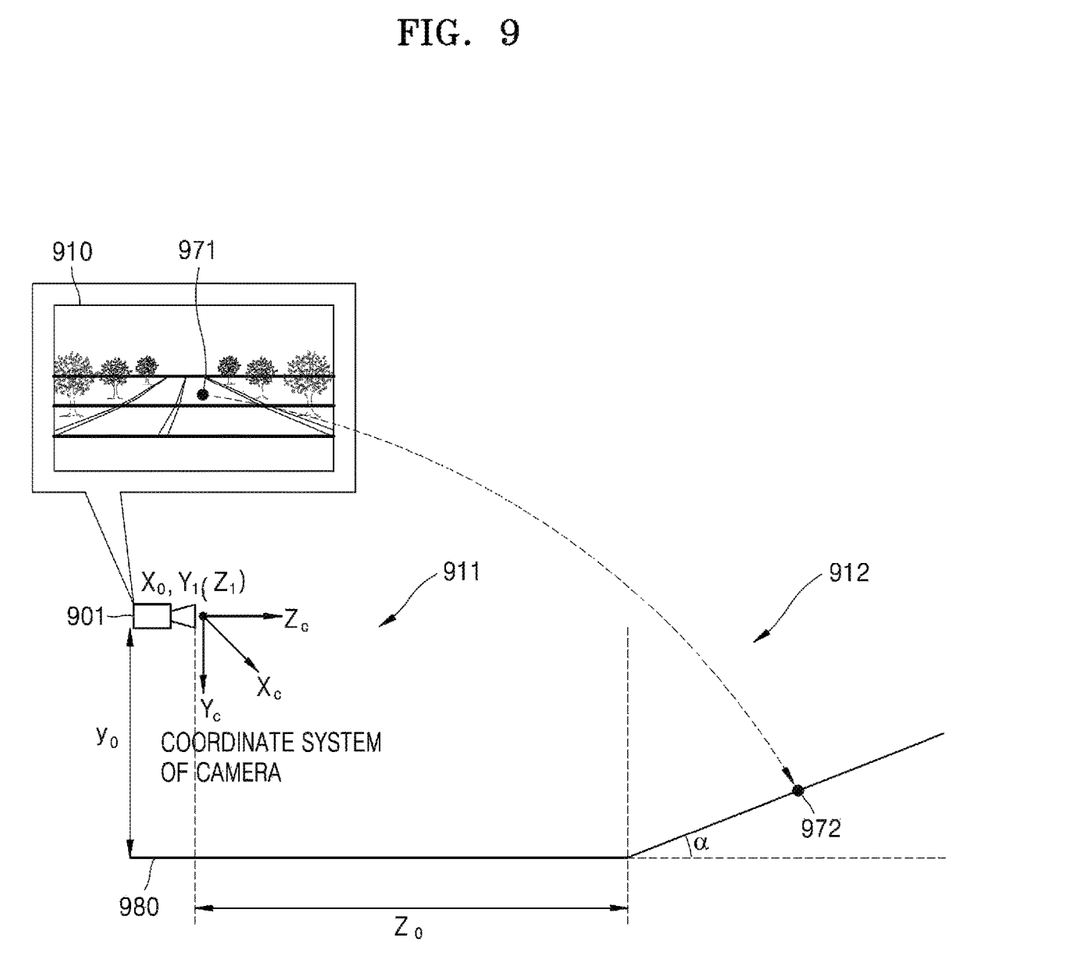
FIG. 9 is a diagram for explaining calculation of a translation relation and generation of road profile data, according to an embodiment.

Referring to FIG. 9, the image converting apparatus may calculate a translation relation for converting pixel coordinates of a corresponding region image into physical coordinates, based on a vanishing point of each region image and a distance to a starting point of the region image.

FIG. 9 is a diagram for explaining calculation of a translation relation and generation of road profile data, according to an embodiment.

By using an image obtainer 901, the image converting apparatus may calculate a translation relation of each region image that converts each pixel of the input image 910 into physical coordinates. For example, the input image 910 of FIG. 9 may be divided into a first region image corresponding to a first region 911 and a second region image corresponding to a second region 912. Referring to FIG. 9, a center axis of a viewing angle of the image obtainer 901 may correspond to a $Z_c$ axis. A $Y_c$ axis may indicate an axis perpendicular to a surface where the image obtainer 901 is placed. An $X_c$ axis is orthogonal to the $Y_c$ axis and the $Z_c$ axis, and when the image converting apparatus is installed in a vehicle, the $X_c$ axis may correspond to a lateral axis of the vehicle. FIG. 9 shows that physical coordinates of the image obtainer 901 are $(X_1, Y_1, Z_1)$, and in the following Equations, it is assumed that the coordinate of the image obtainer 901 is the origin.

The image converting apparatus may calculate a first translation relation for converting pixel coordinates of a first region image of a region (e.g., a first region 911) that is the closest to the image obtainer 901 into physical coordinates by using Equations 1 to 3. The pixel coordinates may be coordinates of a target point in the first region image on the input image 910.

$$y = -y_0 \qquad \text{[Equation 1]}$$

$$x = -\frac{(x_{im} - p_x)}{(y_{im} - p_y)} \cdot \frac{f_y}{f_x} \cdot y_0 \qquad \text{[Equation 2]}$$

$$z = -\frac{f_y}{(y_{im} - p_y)} \cdot y_0 \qquad \text{[Equation 3]}$$

where, x, y, and z may respectively indicate an x coordinate, a y coordinate, and a z coordinate of a physical location of a target point, with respect to the coordinate of the origin, that is a location of the image obtainer 901. A constant $y_0$ may indicate a height of the image obtainer 901 from the ground. In the above Equations 2 and 3, $x_{im}$ may be an x coordinate of a pixel coordinate indicating a target point of the input image 910, and $y_{im}$ may be a y coordinate of the pixel coordinate indicating the target point of the input image 910. In the above Equations 1 to 3, $p_x$ may be an x coordinate of a vanishing point of the first region image of the input image 910, and $p_y$ may be a y coordinate of the vanishing point of the first region image. Also, $f_x$ is a value of a camera parameter that may indicate, for example, a value obtained by dividing a value of a focal length by an x-axis length of a sensing element (e.g., a pixel element) in an image sensor, and $f_y$ is a value of a camera parameter that may indicate, for example, a value obtained by dividing the focal length by a y-axis length of the sensing element. In other words, $f_x$ indicates a value of the focal length that is expressed as a number of pixels on an x-axis and G indicates a value of the focal length that is expressed as a number of pixels on a y-axis. For example, when the focal length is f=300 um, and a y-axis length of one pixel element is 2 um, $f_y$ is equal to 150 (that is, 150 pixels).

Equations 1 to 3 may be applied only to a plane parallel to an optical axis of the image sensor. For example, the image converting apparatus may convert pixel coordinates of the first region 911 from the vehicle to a target point corresponding to the critical point into physical coordinates, based on translation relations according to the above Equations 1 to 3. It is because an inclination level of a road 980 changes in a region after the critical point detected from the input image 910. As described above, the inclination level is an angle of a road with respect to a plane (e.g., the ground on which the image obtainer 901 is placed) that is parallel to the optical axis of the image obtainer 901, and the inclination level is indicated as α in FIG. 9.

The image converting apparatus may calculate the inclination levels of the divided region images based on the vanishing points, the inclination levels calculated with respect the plane parallel to the center axis of the viewing angle of the image sensor. The image converting apparatus may calculate an inclination level of a second region image of the second region 912 via Equation 4.

$$\alpha = \tan\theta = \frac{p_{y2} - p_{y1}}{f_{y1}} \quad \text{[Equation 4]}$$

where, α is an inclination level, θ is an inclination angle, $p_{y2}$ is a y coordinate of a second vanishing point of some road boundary lines shown in the second region image, and $p_{y1}$ is a y coordinate of a first vanishing point of some road boundary lines shown in the first region image.

The inclination angle θ may indicate an angle of a physical plane, on which a target point of the second region image is placed, with respect to the ground on which the image obtainer 901 is placed. The inclination level α may indicate a value corresponding to the inclination angle θ and in the above Equation 4, the inclination level α may be a tangent value.

The image converting apparatus may calculate a translation relation of each region image that converts 2D pixel coordinates of a target point included in a corresponding region image into 3D coordinates, based on a vanishing point, a camera parameter, a camera height, an inclination level, and a start depth of the corresponding region image.

For example, the image converting apparatus may calculate a second translation relation for converting pixel coordinates of the second region image of the second region 912 into physical coordinates via Equation 5 to 7.

$$x = -\frac{(x_{im} - p_{xz})}{\alpha \cdot f_y - (y_{im} - p_{y2})} \cdot \frac{f_y}{f_x} \cdot (y_0 + \alpha \cdot z_0) \quad \text{[Equation 5]}$$

$$z = -\frac{f_y}{\alpha \cdot f_y - (y_{im} - p_{yz})} \cdot (y_0 + \alpha \cdot z_0) \quad \text{[Equation 6]}$$

$$y = -y_o + \alpha \cdot (z - z_0) \quad \text{[Equation 7]}$$

where, $x_{im}$ may be an x coordinate of a target point of the input image 910, and $y_{im}$ may be a y coordinate of the target point of the input image 910. In Equation 5 to 7, $p_{x2}$ may be an x coordinate of a vanishing point of the second region image of the input image 910, $p_{y2}$ may be a y coordinate of the second region image of the input image 910, and $f_x$ and $f_y$ may be values of camera parameters. As shown in Equation 7, a height of the target point may differ from the constant $y_0$ that is the height of the image obtainer 901 according to the inclination level α.

In Equations 5 to 7, $z_0$ may indicate a distance from the image obtainer 901 to the critical point that is a boundary between the first region image and the second region image from each other. Therefore, $z_0$ may indicate a distance from the image obtainer 901 to the second region 912.

For reference, Equations 5 to 7 may indicate general-use relations (e.g., general-use equations) with regard to respective region images based on the critical points. For example, when it is assumed that target points corresponding to the first region image have an inclination level α of 0, and a distance $z_0$ to the critical point is 0, it is found that Equations 5 to 7 become identical to Equations 1 to 3.

Therefore, the image converting apparatus may calculate the translation relations of respective region images, which are segmented based on the critical point, sequentially from the region image that is closest to the image obtainer 901. For example, the image converting apparatus may calculate a critical point and a vanishing point of an arbitrary region image and a translation relation for the arbitrary region image according to Equations 5 to 7, and then may calculate a critical point, a vanishing point, and a translation point of a next region image. As described, the image converting apparatus may calculate the translation relations of the region images by sequentially repeating the above processes.

The image converting apparatus may generate road profile data of the road 980 which includes coordinates of a physical location 972 of each point 971. As described above, the road profile data may be profile data defining a shape of the road 980 when each target point of the input image 910 is actually located in a physical world. The road profile data may be converted to an output image at a second view (e.g., a top view).

The image converting apparatus may calculate the translation relations that respectively correspond to the region images segmented based on the critical point, thereby generating accurate road profile data. For example, the image converting apparatus may exclude target points of each region image (e.g., vehicles, buildings, street trees, animals, etc.) identified as objects and apply the calculated translation relation of the corresponding region image to other target points, thereby generating the road profile data.

Figure 10:
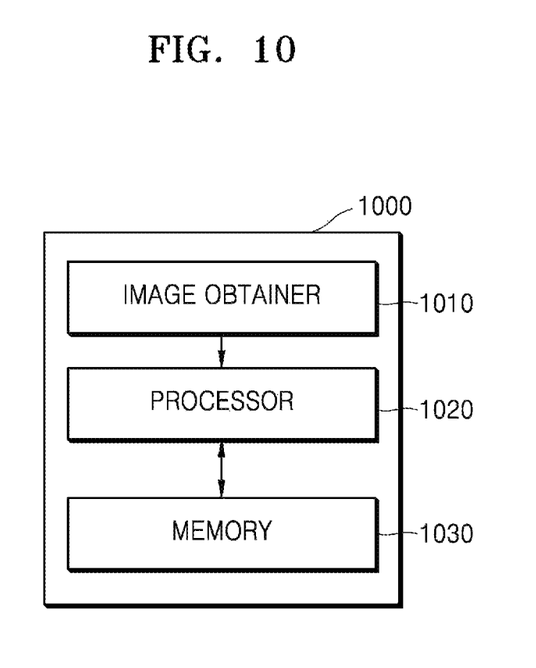
FIG. 10 is a block diagram of a structure of an apparatus for converting an image, according to an embodiment.

FIG. 10 is a block diagram of a structure of an image converting apparatus 1000, according to an embodiment.

The image converting apparatus 1000 may include an image obtainer 1010, a processor 1020, and a memory 1030.

The image obtainer 1010 may obtain an input image regarding a road ahead. The image obtainer 1010 may be provided as, for example, an image sensor such as a color camera. However, types of image sensors are not limited thereto. The image obtainer 1010 may be provided as an infrared sensor, or the like.

The processor 1020 may segment the input image into region images. For example, the processor 1020 may segment the input image into region images based on inclination levels of the road. For example, the processor 1020 may calculate one or more critical points at which an inclination level of the road changes at a threshold degree or greater and segment the input image into region image based on the one or more critical points. The processor 1020 may determine a vanishing point with regard to each of the region images. The processor 1020 may calculate a translation relation for converting 2D coordinates of each region image into 3D coordinates based on the vanishing point. Based on the translation relation calculated with regard to each region image, the processor 1020 may generate road profile data from the region images. However, operations of the processor 1020 are not limited thereto, and the processor 1020 may perform operations of FIGS. 1 to 9.

The memory 1030 may temporarily or permanently store data that are used to perform the method of converting images. For example, the memory 1030 may store the translation relation calculated with regard to each region image, the road profile data calculated based on the translation relation for each region image, and the like.

One or more embodiments may be embodied as computer-readable code on a computer-readable recording medium. The computer-readable recording medium is any data storage device that can store data that can be thereafter read by a computer system. Examples of the computer-readable recording medium include a read-only memory (ROM), a random-access memory (RAM), a compact disk (CD)-ROMs, a magnetic tape, a floppy disk, and an optical data storage device. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs.

At least one of the components, elements, modules or units described herein may be embodied as various numbers of hardware, software and/or firmware structures that execute respective functions described above, according to an embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

Although a few embodiments have been shown and described, it would be appreciated by those skilled in the art that changes may be made in the embodiments without departing from the principles and spirit of the disclosure, the scope of which is defined in the claims and their equivalents.

What is claimed is:

1. A method of converting an image, the method comprising:

segmenting an input image of a road into a plurality of region images, the plurality of region images comprising a first region image and a second region image;

determining a first vanishing point corresponding to the first region image and a second vanishing point corresponding to the second region image, the second vanishing point being different from the first vanishing point;

obtaining a first translation relation for converting two-dimensional (2D) coordinates of a point in the first region image into three-dimensional (3D) coordinates, based on the first vanishing point, and obtaining a second translation relation for converting 2D coordinates of a point in the second region image into 3D coordinates, based on the first vanishing point and the second vanishing point; and generating road profile data based on the first translation relation and the second translation relation.

2. The method of claim 1, wherein the segmenting comprises:

identifying a road boundary line from the input image;

obtaining at least one critical point of the road boundary line; and segmenting the input image into the plurality of region images based on the at least one critical point.

3. The method of claim 2, wherein the obtaining the at least one critical point comprises:

dividing the road boundary line into a plurality of sections;

obtaining slopes of the plurality of sections of the road boundary line; and obtaining the at least one critical point based on the slopes of the plurality of sections of the road boundary line.

4. The method of claim 3, wherein the obtaining the at least one critical point comprises determining, as a critical point, a point between two adjacent sections of the road boundary line from among the plurality of sections of the road boundary line in response to a slope difference between the two adjacent sections of the road boundary line being greater than a threshold difference.

5. The method of claim 2, wherein the segmenting the input image comprises segmenting the input image based on at least one horizontal line of the input image that comprises the at least one critical point.

6. The method of claim 2, wherein the obtaining the at least one critical point comprises:
in response to a plurality of road boundary lines being detected from the input image, selecting a road boundary line that is closest to a center of the input image, from among the plurality of road boundary lines; and
obtaining at least one critical point of the selected road boundary line.

7. The method of claim 1, wherein the determining the first vanishing point comprises:
extending a plurality of road boundary lines included in the first region image; and
determining a point at which the extended plurality of road boundary lines cross each other as the first vanishing point of the first region image.

8. The method of claim 7, wherein the determining the point comprises, in response to the extended plurality of road boundary lines included in the first region image crossing at a plurality of points, determining a single point among the plurality of points as the first vanishing point of the first region image.

9. The method of claim 1, wherein the obtaining the second translation relation comprises obtaining an inclination level of the second region image by using a difference between the first vanishing point and the second vanishing point, wherein the inclination level is with respect to a plane parallel to a center axis of a viewing angle of an image sensor that captures the input image.

10. The method of claim 1, wherein the road profile data comprises coordinates of a physical location of each point of the input image.

11. A non-transitory computer-readable recording medium having recorded thereon at least one computer program comprising a command for executing a method of converting an image, the method comprising:
segmenting an input image of a road into a plurality of region images, the plurality of region images comprising a first region image and a second region image;
determining a first vanishing point corresponding to the first region image and a second vanishing point corresponding to the second region image, the second vanishing point being different from the first vanishing point;
obtaining a first translation relation for converting two-dimensional (2D) coordinates of a point in the first region image into three-dimensional (3D) coordinates, based on the first vanishing point, and obtaining a second translation relation for converting 2D coordinates of a point in the second region image into 3D coordinates, based on the first vanishing point and the second vanishing point; and
generating road profile data based on the first translation relation and the second translation relation.

12. An apparatus for converting an image, the apparatus comprising:
an image sensor configured to obtain an input image of a road; and
a processor configured to:
segment the input image into a plurality of region images, the plurality of region images comprising a first region image and a second region image, and determine a first vanishing point corresponding to the first region image and a second vanishing point corresponding to the second region image, the second vanishing point being different from the first vanishing point;
obtain a first translation relation for converting two-dimensional (2D) coordinates of a point in the first region image into three-dimensional (3D) coordinates, based on the first vanishing point, and obtaining a second translation relation for converting 2D coordinates of a point in the second region image into 3D coordinates, based on the first vanishing point and the second vanishing point; and
generate road profile data based on the first translation relation and the second translation relation.

13. The apparatus of claim 12, wherein the processor is further configured to identify a road boundary line from the input image, obtain at least one critical point of the road boundary line, and segment the input image into the plurality of region images based on the at least one critical point.

14. The apparatus of claim 13, wherein the processor is further configured to divide the road boundary line into a plurality of sections, obtain slopes of the plurality of sections of the road boundary line, and obtain the at least one critical point based on the slopes of the plurality of sections of the road boundary line.

15. The apparatus of claim 14, wherein the processor is further configured to determine, as a critical point, a point between two adjacent sections of the road boundary line from among the plurality of sections of the road boundary line in response to a slope difference between the two adjacent sections of the road boundary line being greater than a threshold difference.

16. The apparatus of claim 13, wherein the processor is further configured to segment the input image based on at least one horizontal line of the input image that comprises the at least one critical point.

17. The apparatus of claim 13, wherein, in response to a plurality of road boundary lines being detected from the input image, the processor is further configured to select a road boundary line, which is closest to a center of the input image from among the plurality of road boundary lines, and obtain at least one critical point of the selected road boundary line.

18. The apparatus of claim 12, wherein the processor is further configured to extend a plurality of road boundary lines included in the first region image of the plurality of region images and determine a point at which the extended plurality of road boundary lines cross each other as the first vanishing point of the first region image.

19. The apparatus of claim 12, wherein the processor is further configured to obtain an inclination level of the second region image by using a difference between the first vanishing point and the second vanishing point, wherein the inclination level is with respect to a plane parallel to a center axis of a viewing angle of the image sensor.

20. The apparatus of claim 12, wherein the processor is further configured to generate the road profile data comprising coordinates of a physical location of each point of the input image.

* * * * *